United States Patent [19]
Uesugi

[11] Patent Number: 6,038,264
[45] Date of Patent: Mar. 14, 2000

[54] DATA RECEIVING APPARATUS

[75] Inventor: Mitsuru Uesugi, Yokohama, Japan

[73] Assignee: Matsushita Electric Industrial Co., Ltd., Osaka, Japan

[21] Appl. No.: 08/804,964

[22] Filed: Feb. 24, 1997

[30] Foreign Application Priority Data

Feb. 26, 1996 [JP] Japan ................................. 8-061628

[51] Int. Cl.[7] .................................................. H03K 9/00
[52] U.S. Cl. .......................... 375/316; 375/340; 375/349; 375/324
[58] Field of Search .................................. 375/261, 267, 375/279, 280, 281, 316, 329, 331, 332, 340, 347, 349; 455/132, 135, 134

[56] References Cited

U.S. PATENT DOCUMENTS

| | | | |
|---|---|---|---|
| 4,663,768 | 5/1987 | Ryu ......................................... | 455/133 |
| 5,203,027 | 4/1993 | Nounin et al. ........................... | 455/135 |
| 5,418,815 | 5/1995 | Ishikawa et al. ........................ | 375/321 |
| 5,488,638 | 1/1996 | Kazecki et al. ......................... | 375/347 |
| 5,621,770 | 4/1997 | Zastera .................................... | 455/135 |
| 5,742,896 | 4/1998 | Bose et al. .............................. | 455/135 |

FOREIGN PATENT DOCUMENTS

| | | |
|---|---|---|
| 4213257 | 8/1992 | Japan . |
| 7321865 | 12/1995 | Japan . |
| 8116344 | 5/1996 | Japan . |

*Primary Examiner*—Chi H. Pham
*Assistant Examiner*—Emmanuel Bayard
*Attorney, Agent, or Firm*—Pollock, Vande Sande & Amernick

[57] ABSTRACT

A data receiving apparatus. A plurality of A/D converters are used to convert a received input signal into digital signals having different sampling phases. Each of the digital signals is demodulated, and applied to a discriminator for obtaining a logic state from the demodulated signal. The logic state derived from the discriminator is compared with the demodulated signal producing the logic signal in a comparing circuit to derive an error. An error comparing circuit compares each of the errors, and a data selector responds to the error comparing circuit to select the logic signal showing the smallest error as decoded data.

13 Claims, 13 Drawing Sheets

DATA RECEIVING APPARATUS

BACKGROUND OF THE INVENTION

1. Technical Field

The present invention relates generally to a data receiving apparatus which may be employed in digital mobile communication, and more particularly to a data receiving apparatus designed to decode data at an appropriate signal identification point.

2. Background of Related Art

The data decoding in data receivers used in digital radio communication is usually accomplished by converting an input analog signal to digital signals and identifying logic levels of the digital signals at symbol identification points. The precise detection of the symbol identification points results in improved quality of a received signal.

FIG. 13 shows one example of such data receivers. The shown data receiver includes generally an in-phase signal A/D converter 3 and a quadrature-phase signal A/D converter 4, a demodulator 10, and a clock reproducing unit 12. The in-phase signal A/D converter 3 and the quadrature-phase signal A/D converter 4 sample an input signal 1 (i.e., an in-phase signal I) and an input signal 2 (i.e., a quadrature-phase signal Q), respectively. The clock reproducing unit 12 provides the A/D converters 3 and 4 with identification timing signals 13, each indicating the timing in which their sampling operations are to be performed. The demodulator 10 demodulates the signals sampled by the A/D converters 3 and 4 to provide demodulated data 11.

Narrow-band modulated signals usually need to be identified logically with timing where their eye patterns are opened most greatly for avoiding reduction in error rate. Thus, in the shown data receiver, the clock reproducing unit 12 determines timing where eye patterns are opened the widest to provide the identification timing signals 13 to the A/D converters 3 and 4, respectively, prior to demodulation in the demodulator 10. The A/D converters 3 and 4 are responsive to the identification timing signals 13 to sample the input signals 1 and 2, respectively. The demodulator 10 then demodulates the sampled signals. This prevents the bit error rate of the demodulated data 11 from being increased.

The above data receiver however has the drawback in that the demodulation operations cannot be performed until symbol identification information is derived, and a preamble signal needs to be added to a leading portion of data for reproducing clocks. This leads to reduction in data transmission efficiency.

SUMMARY OF THE INVENTION

It is therefore a principal object of the present invention to avoid the disadvantages of the prior art.

It is another object of the present invention to provide a data receiving apparatus designed to decode an input signal with optimum timing.

According to one aspect of the present invention, there is provided a data receiving apparatus which comprises: (a) an A/D converting circuit converting an input signal into a sequence of digital signals at a given sampling rate; (b) demodulators demodulating portions of the digital signals converted with difference sampling phases by the A/D converting circuit to produce demodulated signals, respectively; (c) discriminators determining logic levels of the demodulated signals provided from the demodulators to produce logic signals, respectively; (d) an error comparing circuit comparing errors, each existing between one of the demodulated signals and corresponding one of the logic signals to determine the smallest one of the errors; and (e) a selecting circuit selecting one out of the logic signals showing the smallest error to provide the selected one as decoded data.

In the preferred mode of the invention, a timing signal generator is further provided which outputs sampling timing signals in sequence to the A/D converters with given phase shifts. The A/D converting circuit includes a plurality of A/D converters converting the input signal into the digital signals with the difference sampling phases in response to the sampling timing signals.

The error comparing circuit compares the errors to determine the smallest one during every symbol decoding of symbols carried by the input signal.

The A/D converting circuit may include a pair of A/D converters which convert first and second input signals into first and second sequences of digital signals at the given sampling rate, respectively. A data distributing circuit is further provided. The timing signal generator provides distributing timing signals at given intervals to the data distributing circuit. The distributing circuit is responsive to the distributing timing signals to distribute portions of the first and second sequences of digital signals, in sequence, to the demodulators for converting the first and second sequences of digital signals into the demodulated signals.

Buffer memories may be provided each of which stores a sequence of the logic signals outputted from one of the discriminators over a given number of sampling cycles. The error comparing circuit determines cumulative errors each including the errors provided by the discriminators over the given number of sampling cycles, respectively, to select the smallest one of the cumulative errors. The selecting circuit provides as the decoded data the logical signals outputted from one of the discriminators showing the smallest cumulative error, stored in one of the buffer memories.

A feedback variable setting circuit and subtracting circuits may be provided. The feedback variable setting circuit estimates delayed wave components included in the demodulated signals. The subtracting circuits subtract the delayed wave components from the demodulated signals to provide delayed wave-removed demodulated signals, respectively. The discriminators identify logic levels of the delayed wave-removed demodulated signals to produce the logic signals.

The subtracting circuits may alternatively subtract the delayed wave components from the digital signals provided by the A/D converting circuit to provide delayed wave-removed demodulated signals, respectively. The discriminators identify logic levels of the delayed wave-removed demodulated signals to produce the logic signals.

According to another aspect of the invention, there is provided a data receiving apparatus which comprises: (1) a first data decoding circuit including (a) a first A/D converting circuit converting a first input signal received by a first antenna into a sequence of digital signals at a given sampling rate, (b) first demodulators demodulating portions of the digital signals converted with difference sampling phases by the first A/D converting circuit to produce demodulated signals, respectively, and (c) first discriminators identifying logic levels of the demodulated signals provided from the first demodulators to produce logic signals, respectively; (2) a second data decoding circuit including (a) a second A/D converting circuit converting a second input signal received by a second antenna into a sequence of digital signals at a given sampling rate, (b) second demodulators demodulating portions of the digital signals converted with difference sampling phases by the second A/D converting circuit to produce second demodulated signals, respectively, and (c) second discriminators identifying logic levels of the demodulated signals provided from the second demodulators to produce logic signals, respectively; (3) an error comparing circuit comparing errors each existing between one of the demodulated signals and corresponding one of the logic signals to determine the smallest one of the errors; and (4) a selecting circuit selecting one out of the logic signals showing the smallest error to provide the selected one as decoded data.

In the preferred mode of the invention, buffer memories are further provided, each of which stores a sequence of the logic signals outputted from one of the first and second discriminators over a given number of sampling cycles. The error comparing circuit determines cumulative errors, each including the errors provided by the first and second discriminators over the given number of sampling cycles, respectively, to select the smallest one of the cumulative errors. The selecting circuit provides as the decoded data the logical signals outputted from one of the first and second discriminators showing the smallest cumulative error, stored in one of the buffer memories.

A feedback variable setting circuit is further provided which estimates delayed wave components included in the first and second demodulated signals. Subtracting circuits are provided which subtract the delayed wave components from the demodulated signals to provide delayed wave-removed demodulated signals, respectively. The first and second discriminators identify logic levels of the delayed wave-removed demodulated signals to produce the logic signals, respectively.

A feedback variable setting circuit is further provided which estimates delayed wave components included in the first and second demodulated signals. Subtracting circuits are provided which subtract the delayed wave components from the digital signals provided by the first and second A/D converting circuit to provide delayed wave-removed digital signals to the first and second demodulators, respectively. The first and second discriminators identify logic levels of the first and second demodulated signals from which the delayed wave components are removed to produce the logic signals.

According to a further aspect of the invention, there is provided a data receiving apparatus which comprises: (1) a timing signal generator providing distributing timing signals at given intervals; (2) a first data decoding circuit including, (a) a first pair of A/D converters converting first and second input signals provided through a first antenna into first and second sequences of digital signals at a given sampling rate, respectively, (b) first demodulators, (c) a first distributing circuit distributing portions of the first and second sequences of digital signals, in sequence, to the first demodulators in response to the distributing timing signals for converting the first and second sequences of digital signals into demodulated signals, respectively, and (d) first discriminators identifying logic levels of the demodulated signals provided from the first demodulators to produce logic signals, respectively; (3) a second data decoding circuit including (a) a second pair of A/D converters converting third and fourth input signals provided through a second antenna into third and fourth sequences of digital signals at a given sampling rate, respectively, (b) second demodulators, (c) a second distributing circuit distributing portions of the third and fourth sequences of digital signals, in sequence, to the second demodulators in response to the distributing timing signals for converting the third and fourth sequences of digital signals into demodulated signals, respectively, and (d) second discriminators identifying logic levels of the demodulated signals provided from the second demodulators to produce logic signals, respectively; (4) an error comparing circuit comparing errors each existing between one of the demodulated signals and corresponding one of the logic signals to determine the smallest one of the errors; and (5) a selecting circuit selecting one out of the logic signals showing the smallest error to provide the selected one as decoded data.

In the preferred mode of the invention, buffer memories are further provided each of which stores a sequence of the logic signals outputted from one of the first and second discriminators over a given number of sampling cycles. The error comparing circuit determines cumulative errors each, including the errors provided by the first and second discriminators over the given number of sampling cycles, respectively, to select the smallest one of the cumulative errors. The selecting circuit provides the decoded data the logical signals outputted from one of the first and second discriminators showing the smallest cumulative error, stored in one of the buffer memories.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
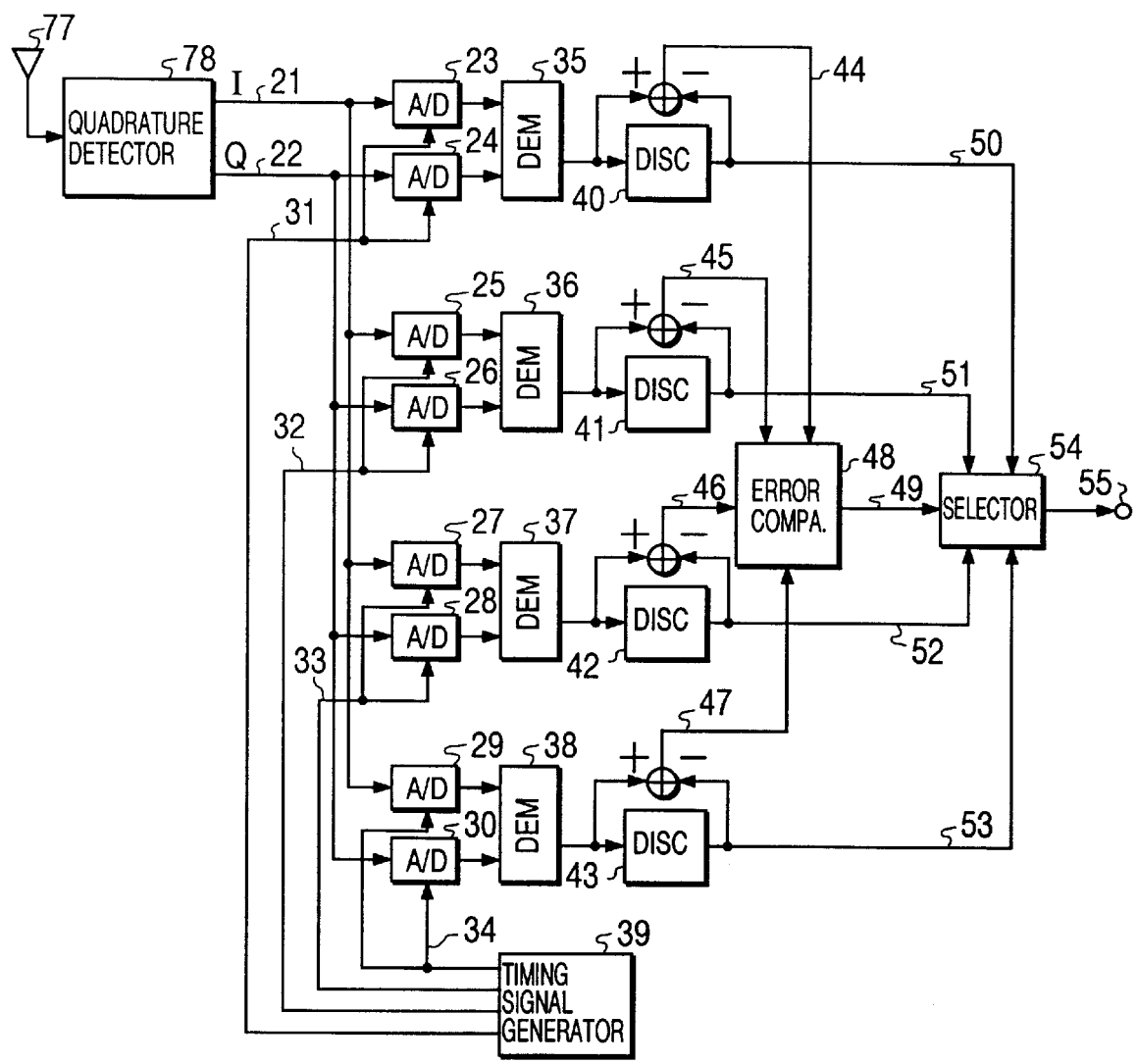
FIG. 1 is a block diagram which shows a circuit structure of a data receiving apparatus according to the first embodiment of the invention.

Referring now to the drawings, wherein like reference numbers refer to like parts in several views, particularly to FIG. 1, there is shown a data receiving apparatus according to the first embodiment of the invention which may be employed in digital mobile communication equipment such as cellular telephones.

The data receiving apparatus generally includes an antenna 77, a quadrature phase detector 78, in-phase signal A/D converters 23, 25, 27, and 29, quadrature-phase signal A/D converters 24, 26, 28, and 30, a timing signal generator 39, demodulators 35, 36, 37, and 38, discriminators 40, 41, 42, and 43, an instantaneous error comparators 48, and a selector 54.

A signal received by the antenna 77 is converted by the quadrature phase detector 78 into an input signal 21 (i.e., an in-phase signal I) and an input signal 22 (i.e., a quadrature-phase signal Q). The in-phase signal A/D converters 23 to 29 sample the input signal 21 at different times in response to timing signals 31, 32, 33, and 34 outputted from the timing signal generator 39. The quadrature-phase signal A/D converters 24 to 30 sample the input signal 22 at different times in response to the timing signals 31, 32, 33, and 34 outputted from the timing signal generator 39. Each of the demodulators 35 to 38 demodulates data is sampled by corresponding two of the A/D converters 23 to 30. Each of the discriminators 40 to 43 determines the logic level of the demodulated data outputted from corresponding one of the demodulators 35 to 38 to produce a logic signal (a binary signal) to the selector 54. The instantaneous error comparator 48 compares differences or errors existing between the input signals and the output signals from the discriminators 40 to 43. The selector 54 selects one of the outputs of the discriminators 40 to 43 which shows the smallest one of the errors.

As clearly shown in the drawing, the timing signal 31 is inputted to the A/D converters 23 and 24. The timing signal 32 is inputted to the A/D converters 25 and 26. The timing signal 33 is inputted to the A/D converters 27 and 28. The timing signal 34 is inputted to the A/D converters 29 and 30. Each of the timing signals 31 to 34 is produced sequentially at the same rate as a symbol rate. The timing signals 31 to 34 are also shifted, in sequence, T/4 apart in phase (T=a symbol interval) so that an absolute value of a maximum shift in data sampling timing falls within T/8.

The demodulators 35 to 38, as mentioned above, demodulate the data sampled by the A/D converters 23 to 30 to provide demodulated signals to the discriminators 40 to 43. The discriminators 40 to 43 logically identify or convert the demodulated signals into the logic signals 50, 51, 52, and 53, respectively, and output them to the selector 54.

The difference between the output from the demodulator 35 and the logic signal 50 is provided as an error signal 44 to the instantaneous error comparator 48. The difference between the output from the demodulator 36 and the logic signal 51 is provided as an error signal 45 to the instantaneous error comparator 48. The difference between the output from the demodulator 37 and the logic signal 52 is provided as an error signal 46 to the instantaneous error comparator 48. The difference between the output from the demodulator 38 and the logic signal 53 is provided as an error signal 47 to the instantaneous error comparator 48.

The instantaneous error comparator 48 compares the error signals 44 to 47 to select one among them which shows the smallest error and provides a comparison signal 49 indicative thereof to the selector 54. The selector 54 is responsive to the comparison signal 49 to select one of the logic signals 50 to 53 which shows the smallest error and outputs it as decoded data 55.

It is preferable that the above data selection be made every decoding of symbols carried by the input signals 21 and 22. This allows one of the logic signals 50 to 53 which has been converted in the discriminators 40 to 43 with the best timing to be selected as the decoded data 55.

The data receiving apparatus of this embodiment eliminates the need for a memory storing signals outputted from the A/D converters 23 to 30 and for reproduction of clocks.

Figure 2:
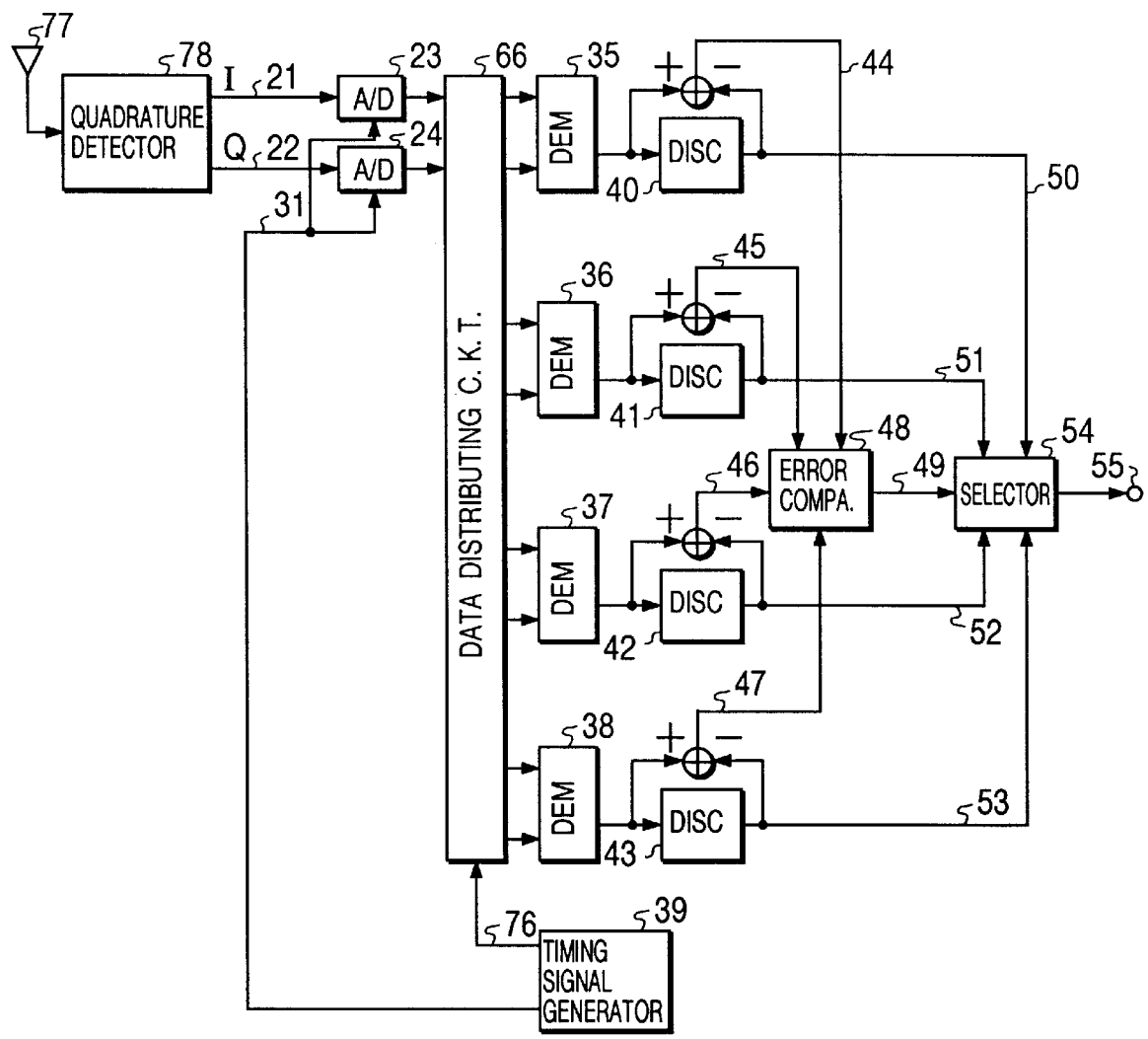
FIG. 2 is a block diagram which shows a circuit structure of a data receiving apparatus according to the second embodiment of the invention.

FIG. 2 shows a data receiving apparatus of the second embodiment which is designed to supply data sampled by a pair of A/D converters to a plurality of demodulators in sequence through a data distributing circuit.

The data receiving apparatus of the this embodiment includes a data distributing circuit 66 which selectively establishes one of connections of the A/D converters 23 and 24 with the demodulators 35 to 38 in response to each of switching timing signals 76 outputted from the timing signal generator 39 for supplying the data sampled by the A/D converters 23 and 24, in sequence, to the demodulators 35 to 38.

The timing signal generator 39 outputs sampling timing signals 31 in sequence at a rate of four times a symbol rate (1/T) to the A/D converters 23 and 24. The A/D converters 23 and 24 are responsive to each of the sampling timing signals 31 to sample data from the input signals 21 and 22. The switching timing signals 76 are outputted from the timing signal generator 39 in sequence at a rate of four times the symbol rate (1/T). The data distributing circuit 66, as described above, provides the data sampled by the A/D converters 23 and 24 in sequence to the demodulators 35 to 38 with phase shifts of T/4 in response to the switching timing signals 76. The sampled data are thus inputted cyclically to each of the demodulators 35 to 38 at the same rate of the symbol rate, similar to the first embodiment.

The operations of the demodulators 35 to 38, the discriminators 40 to 43, the instantaneous error comparator 48, and the selector 54 are identical with those in the first embodiment, and explanation thereof in detail will be omitted here.

As describe above, the data receiving apparatus of this embodiment is smaller in number of A/D converters than the first embodiment. The same data passing through the A/D converters 23 and 24 are thus inputted to the demodulators 35 to 38, thereby resulting in a decreased variation in data quality caused by a unit-to-unit variation in characteristic of the A/D converters. The data is, as described above, sampled by each of the A/D converters 23 and 24 at four sampling phase angles, but the number of the sampling phase angles is not limited to the same. For example an, increase in sampling phase angle is achieved by increasing the sampling rate of the A/D converters 23 and 24, data distributing rate of the data distributing circuit 66, and number of the demodulators and the discriminators.

Figure 3:
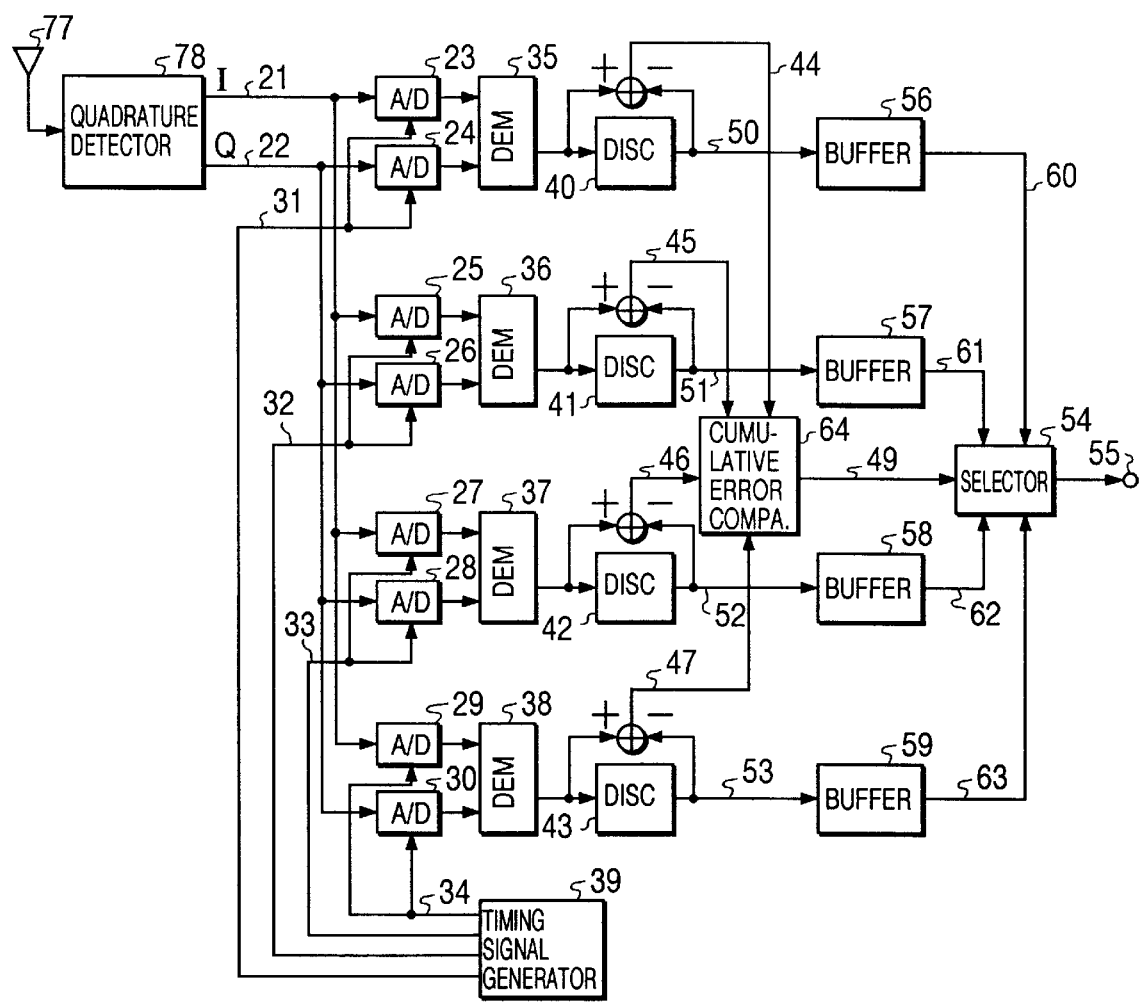
FIG. 3 is a block diagram which shows a circuit structure of a data receiving apparatus according to the third embodiment of the invention.

FIG. 3 shows a data receiving apparatus of the third embodiment which is designed to accumulate errors existing between input signals to and output signals from the discriminators 40 to 43 indicated by the error signals 44 to 47 for several data sampling cycles to compare them for providing as the decoded data 55 an output from one of the discriminators 40 to 43 which shows the smallest one of the accumulated errors.

The data receiving apparatus includes four buffer memories 56, 57, 58, and 59 and a cumulative error comparator 64. Other arrangements are identical with those of the first embodiment, and explanation thereof in detail will be omitted here.

The discriminators 40 to 43 determine the differences (errors) between inputs and outputs thereof sequentially and provide them as the error signals 44 to 47 to the cumulative error comparator 64. The discriminators 40 to 43 also provide the logic signals 50 to 53 in sequence to the buffer memories 56 to 59. The cumulative error comparator 64 accumulates the error signals 44 to 47 over a given number of data sampling cycles, respectively, to determine the smallest one of them and provides a comparison signal 49 indicative thereof to the selector 54. The buffer memories 56 to 59 store therein the logic signals 50 to 53, respectively, for the given number of data sampling cycles until the comparison signal 49 is outputted from the cumulative error comparator 64 and then provide them as demodulated signals 60, 61, 62, and 63 to the selector 54. The selector 54 selects one of the demodulated signals 60 to 63 which has been provided through one of the discriminators 40 to 43 showing the smallest cumulative error and provides it as the decoded data 55 ultimately.

As discussed above, the comparison of the accumulated errors allows optimal one of the demodulated signals 60 to 63 to be selected with a higher accuracy than that in the first embodiment.

Figure 4:
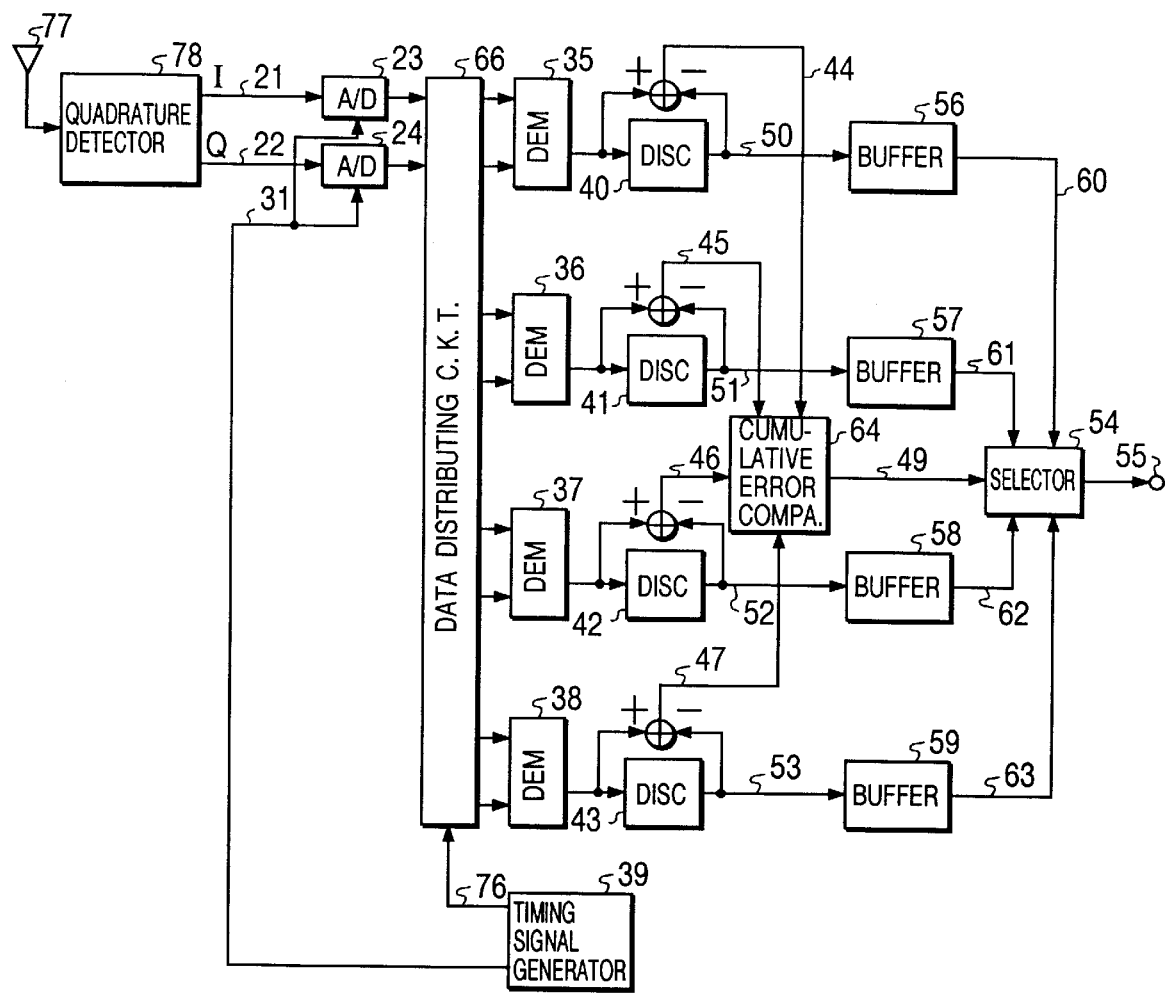
FIG. 4 is a block diagram which shows a circuit structure of a data receiving apparatus according to the fourth embodiment of the invention.

FIG. 4 shows a data receiving apparatus of the fourth embodiment that is a combination of the second and third embodiments.

The data receiving apparatus of this embodiment, as clearly shown in the drawing, includes one pair of A/D converters 23 and 24 and the data distributing circuit 66. The data sampled by the A/D converters 23 and 24 are supplied through the data distributing circuit 66 in sequence to the demodulators 35 to 38 in response to the switching timing signal 76 outputted from the timing signal generator 39. Other arrangements and operations are identical with those of the third embodiment, and explanation thereof in detail will be omitted here.

Figure 5:
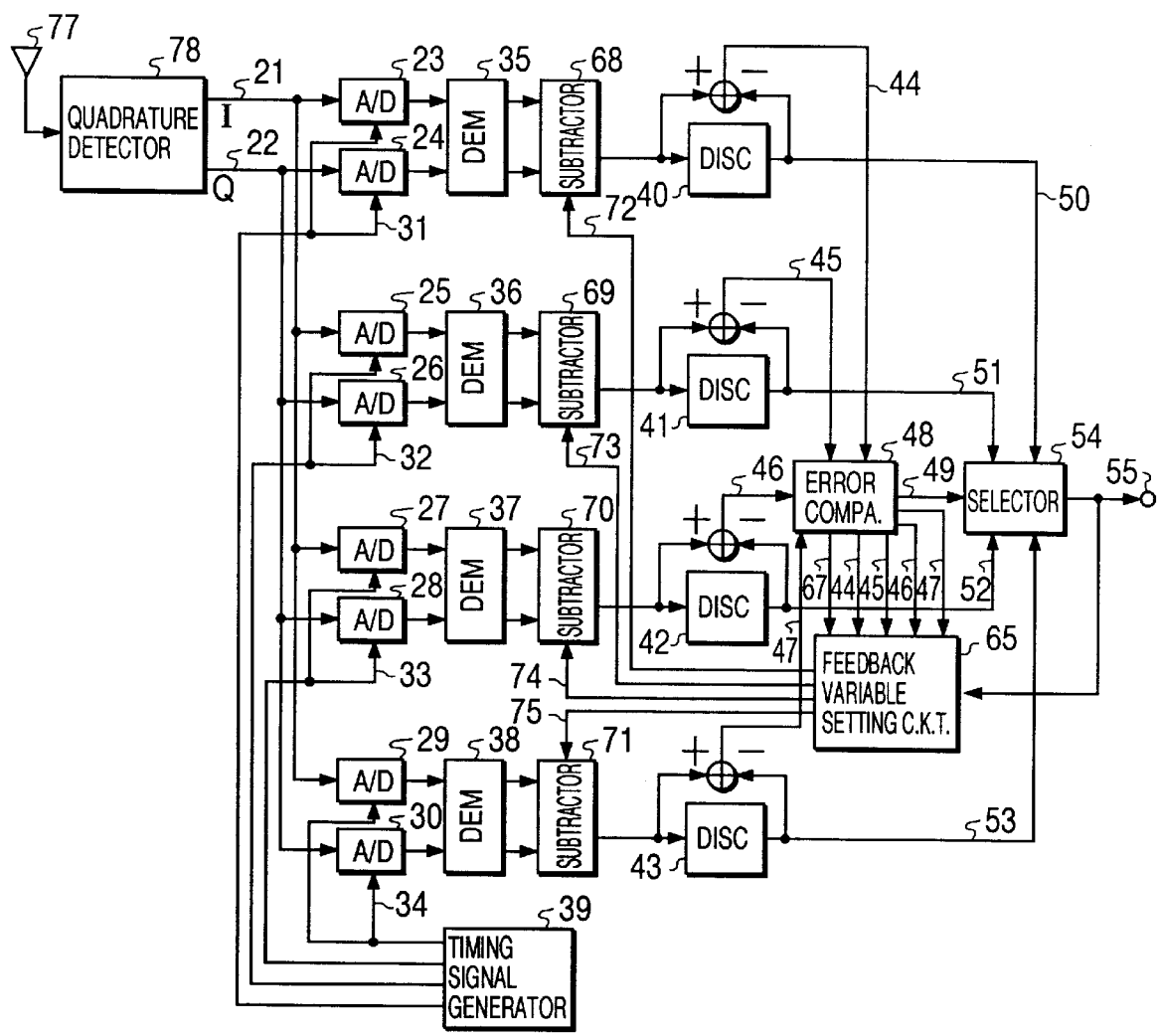
FIG. 5 is a block diagram which shows a circuit structure of a data receiving apparatus according to the fifth embodiment of the invention.

FIG. 5 shows a data receiving apparatus of the fifth embodiment that is a modification of the first embodiment shown in FIG. 1 designed to eliminate the influence of a delayed wave on decoding.

The data receiving apparatus of this embodiment includes a feedback variable setting circuit 65 and subtractors 68, 69, 70, and 71. Other arrangements are identical with those of the first embodiment, and explanation thereof in detail will be omitted here.

The feedback variable setting circuit 65 estimates residual delayed wave components, each existing after demodulation in the demodulators 35 to 38 based on the decoded data 55 selected by the selector 54, a minimum error 67 provided by the instantaneous error comparator 48 (i.e., the smallest of the error signals 44 to 47), and the error signals 44 to 47 using an adaptive algorithm such as a ZF (Zero Forcing), LMS (Lease Mean Square), or RLS (Recursive Least Squares) method and provides replicas thereof as feedback variables 72 to 75 to the subtractors 68 to 71.

The subtractors 68 to 71 subtract the feedback variables 72 to 75 from outputs from the demodulators 35 to 38 to remove delayed wave components remaining in demodulated signals from the demodulators 35 to 38 and provide delayed wave-removed signals to the discriminators 40 to 43. The discriminators 40 to 43 convert the delayed wave-removed signals into the logic signals 50 to 53 and provide them to the selector 54.

The instantaneous error comparator 48 compares the error signals 44 to 47 from the discriminators 40 to 43 to select one among them which shows the smallest value and provides the comparison signal 49 indicative thereof to the selector 54.

The selector 54 is responsive to the comparison signal 49 to select one out of the logic signals 50 to 53 which shows the smallest error and outputs it as decoded data 55. The decoded data 55 is also returned back to the feedback variable setting circuit 65. The feedback variable setting circuit 65 determines the feedback variables 72 to 75 based on the decoded data 55, the minimum error 67, and the error signals 44 to 47, respectively, for subsequent symbol demodulation.

While the fifth embodiment provides the decoded data 55 using the instantaneous errors (i.e., the error signals 44 to 47), however, it may alternatively use the cumulative errors as derived in the third and fourth embodiments.

Figure 6:
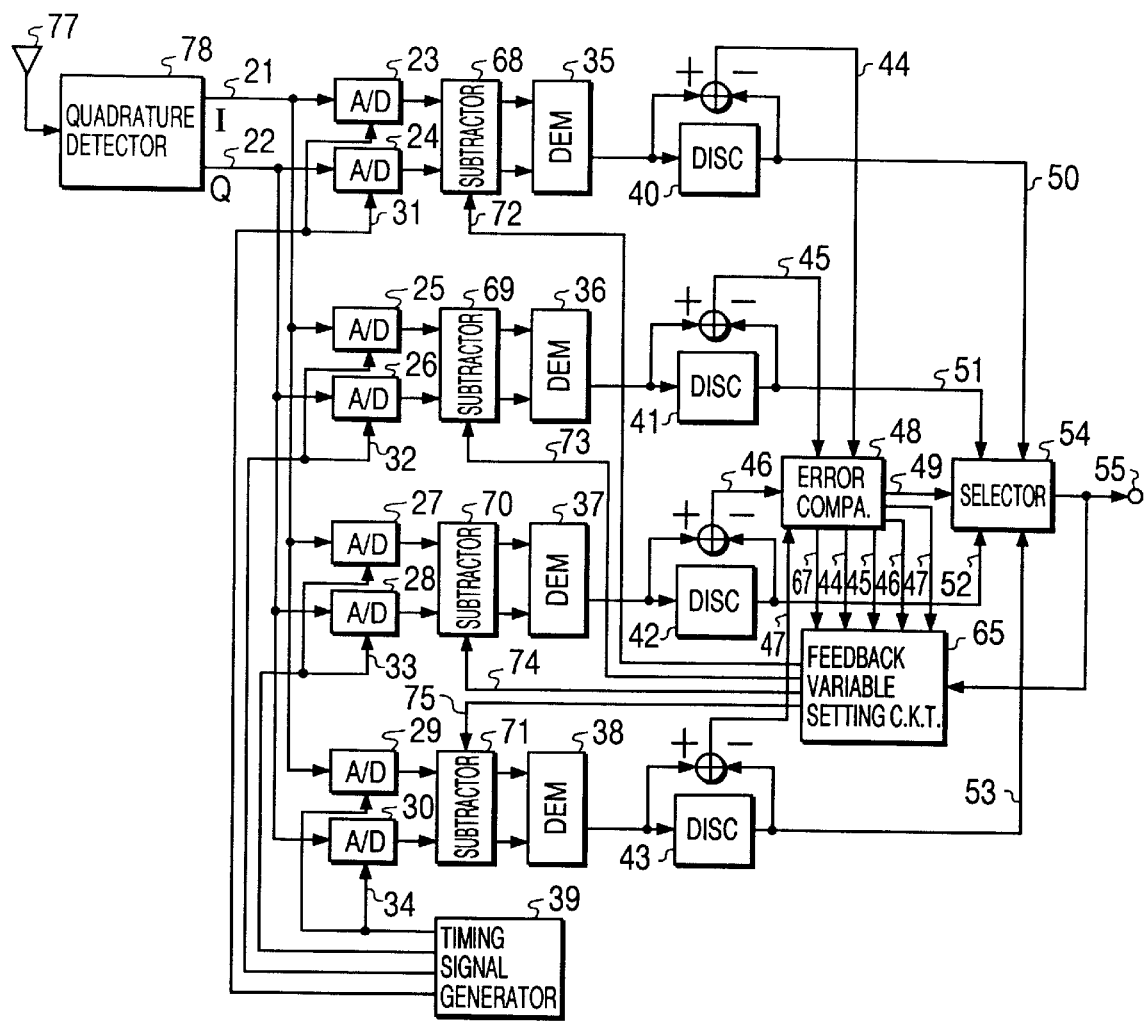
FIG. 6 is a block diagram which shows a circuit structure of a data receiving apparatus according to the sixth embodiment of the invention.

FIG. 6 shows a data receiving apparatus of the sixth embodiment that is a modification of the fifth embodiment.

The data receiving apparatus of this embodiment, as clearly shown in the drawing, has the subtractors 68 to 71 disposed upstream of the demodulators 35 to 38, respectively. Other arrangements are identical with those of the fifth embodiment, and explanation thereof in detail will be omitted here.

The subtractors 68 to 71 subtract the feedback variables 72 to 75 provided by the feedback variable setting circuit 65 from data sampled by the A/D converters 23 to 30 and provide them to the demodulators 35 to 38, respectively. The demodulators 35 to 38 demodulate the outputs from the subtractors 68 to 71 and provide them to the discriminators 40 to 43. Other operations are the same as those of the fifth embodiment.

In the data receiving apparatus of this embodiment, the arrangement of the subtractors 68 to 71 before the demodulators 35 to 38 makes it possible to eliminate the influence of delayed waves remaining in the demodulated data even when nonlinear demodulators performing a differential detection function are used as the demodulators 35 to 38. Linear demodulators may be used in either of the fifth and sixth embodiments.

Figure 7:
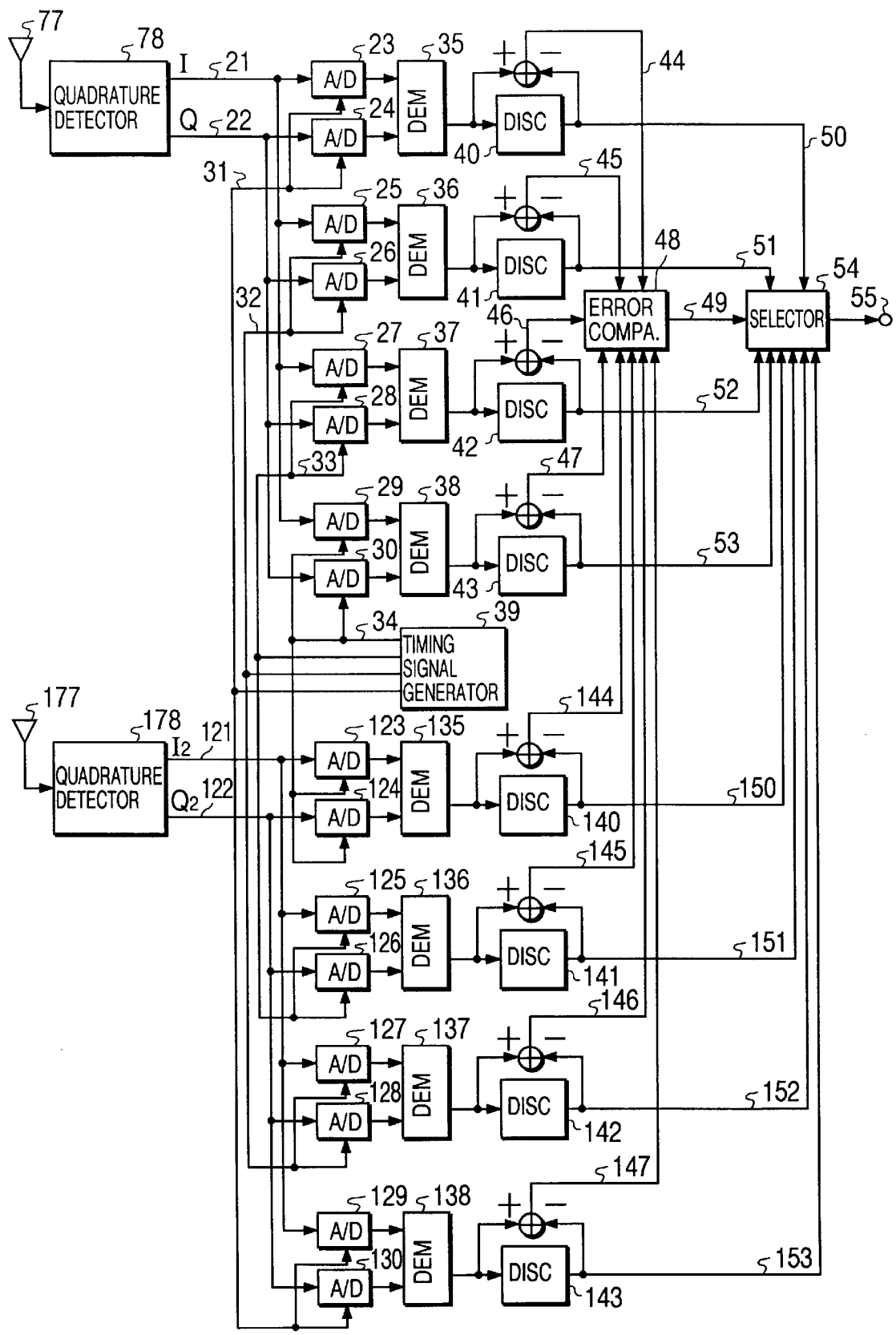
FIG. 7 is a block diagram which shows a circuit structure of a data receiving apparatus according to the seventh embodiment of the invention.

FIG. 7 shows a data receiving apparatus of the seventh embodiment which is designed to receive a signal through a plurality of antennas and demodulate one of the received signals derived under the best condition.

The data receiving apparatus of this embodiment, as can be seen in the drawing, includes two diversity branches, each having the same circuit arrangement as that shown in FIG. 1.

A signal received by a first antenna 77 is converted by a quadrature phase detector 78 into the input signal 21 (i.e., the in-phase signal I) and the input signal 22 (i.e., the quadrature-phase signal Q) which are, in turn, supplied to the A/D converters 23 to 30. Similarly, a signal received by a second antenna 177 is converted by a quadrature phase detector 178 into the input signal 121 (i.e., the in-phase signal $I_2$) and the input signal 122 (i.e., the quadrature-phase signal $Q_2$) which are, in turn, supplied to the A/D converters 123 to 130.

The timing signal generator 39 provides the first sampling timing signals 31 to the A/D converters 23, 24, 129, and 130, the second sampling timing signals 32 to the A/D converters 25, 26, 127, and 128, the third sampling timing signals 33 to the A/D converters 27, 28, 125, and 126, and the fourth sampling timing signals 34 to the A/D converters 29, 30, 123, and 124. Each of the sampling timing signals 31 to 34 is outputted in sequence at the same rate as a symbol rate, but they are shifted T/4 (T=a symbol interval) in phase apart from each other.

The demodulated signal outputted from each of the demodulators 35 to 39 and 135 to 138 enter corresponding one of the discriminators 40 to 43 and 140 to 143. The discriminators 140 to 143 logically convert the demodulated signals into logic signals 50 to 53 and 150 to 153, respectively, and output them to the selector 54.

The differences between the outputs from the demodulators 135 to 138 and the logic signals 150 153 are provided as error signals 144 to 147 to the instantaneous error comparator 48.

The instantaneous error comparator 48 compares the error signals 144 to 147 to select one among them which shows the smallest error and provides the comparison signal 49 indicative thereof to the selector 54. The selector 54 is responsive to the comparison signal 49 to select one of the logic signals 150 to 153 which shows the smallest error and outputs it as decoded data 55.

As already discussed above, the sampling timing signals 31 to 34 are shifted T/4 in phase apart from each other. Thus, demodulated data which has been received through one of the first and second antennas 77 and 177 under a better condition and sampled with a maximum phase shift of less than T/4 is obtained by selecting optimum one out of eight decoding circuits: a first circuit consisting of the A/D converters 23 and 24 and the demodulator 35, a second circuit consisting of the A/D converters 25 and 26 and the demodulator 36, a third circuit consisting of the A/D converters 27 and 28 and the demodulator 37, a fourth circuit consisting of the A/D converters 29 and 30 and the demodulator 39, a fifth circuit consisting of the A/D converters 123 and 124 and the demodulator 135, a sixth circuit consisting of the A/D converters 125 and 126 and the demodulator 136, a seventh circuit consisting of the A/D converters 127 and 128 and the demodulator 137, an eighth circuit consisting of the A/D converters 129 and 130 and the demodulator 139.

The data selection of the selector 54 is performed for every symbol of the input signals, thereby allowing the input signals 21 and 22 or 121 and 122 which have been received through either of the first and second antennas under a better condition and sampled with a better timing, to be decoded. This avoids the reduction in quality of the demodulated data and results in an increase in diversity gain.

The data sampling phases in this apparatus may further be increased. This apparatus, as clearly shown in the drawing, uses two diversity branches, however, the number of diversity branches may also be increased.

Figure 8:
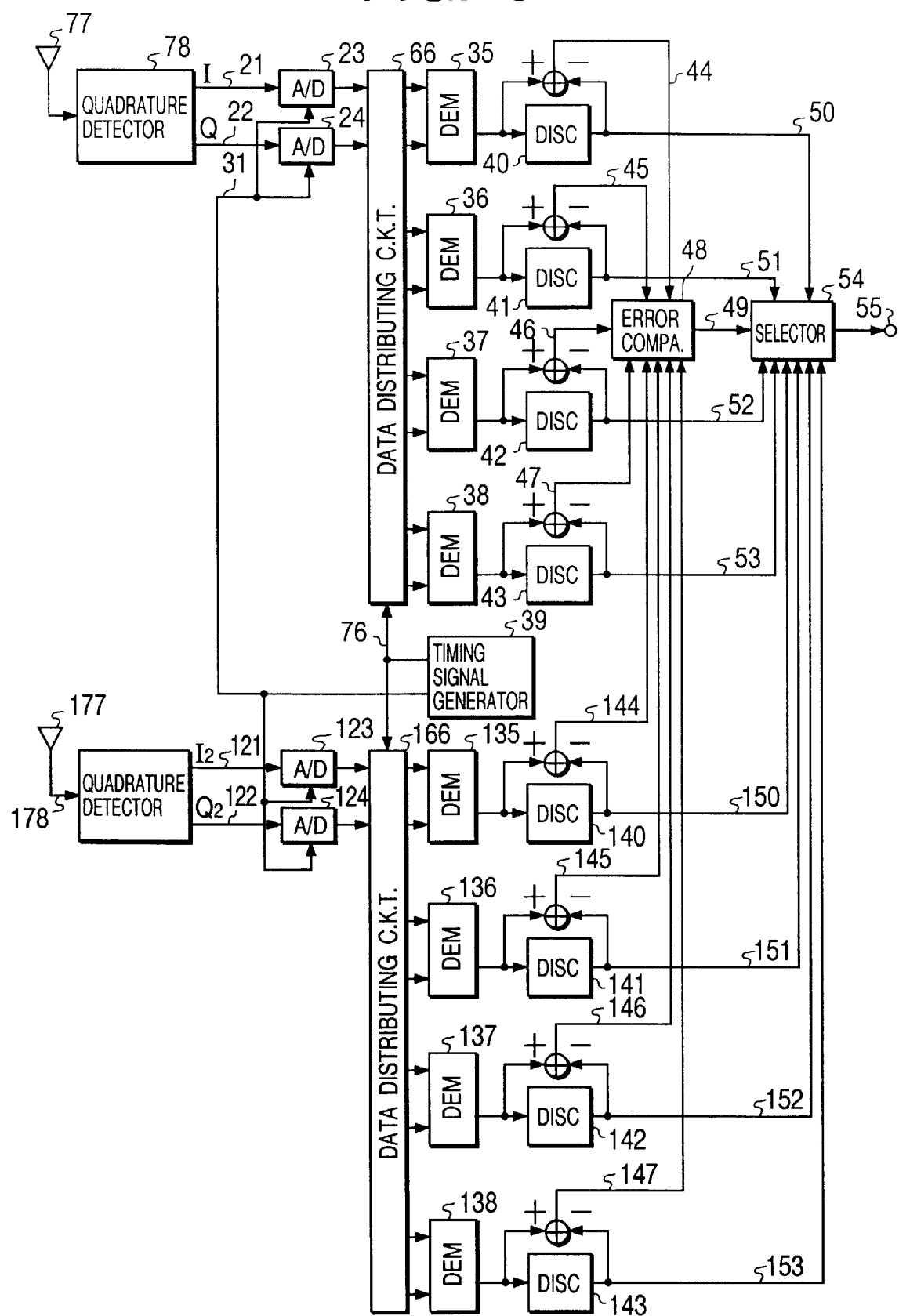
FIG. 8 is a block diagram which shows a circuit structure of a data receiving apparatus according to the eighth embodiment of the invention that has two diversity branches, each including the same arrangement as that of the second embodiment.

FIG. 8 shows a data receiving apparatus according to the eighth embodiment which includes two diversity branches, each having the same circuit arrangement as that shown in FIG. 2.

The timing signal generator 39 outputs the sampling timing signals 31 in sequence at a rate of four times a symbol rate (1/T) to the A/D converters 23, 24, 123, and 124. The switching timing signals 76 are outputted from the timing signal generator 39 in sequence at a rate of four times the symbol rate (1/T).

The data distributing circuit 66 provides the data sampled by the A/D converters 23 and 24 in sequence to the demodulators 35 to 38 with phase shifts of T/4 in response to the switching timing signals 76. Similarly, the data distributing circuit 166 provides the data sampled by the A/D converters 123 and 124 in sequence to the demodulators 135 to 138 with phase shifts of T/4 in response to the switching timing signals 76. The sampled data are thus inputted cyclically to each of the demodulators 35 to 138 at the same rate of the symbol rate.

The operations of the demodulators 35 to 138, the discriminators 40 to 143, the instantaneous error comparator 48, and the selector 54 are identical with those in the above embodiments, and explanation thereof in detail will be omitted here.

Figure 9:
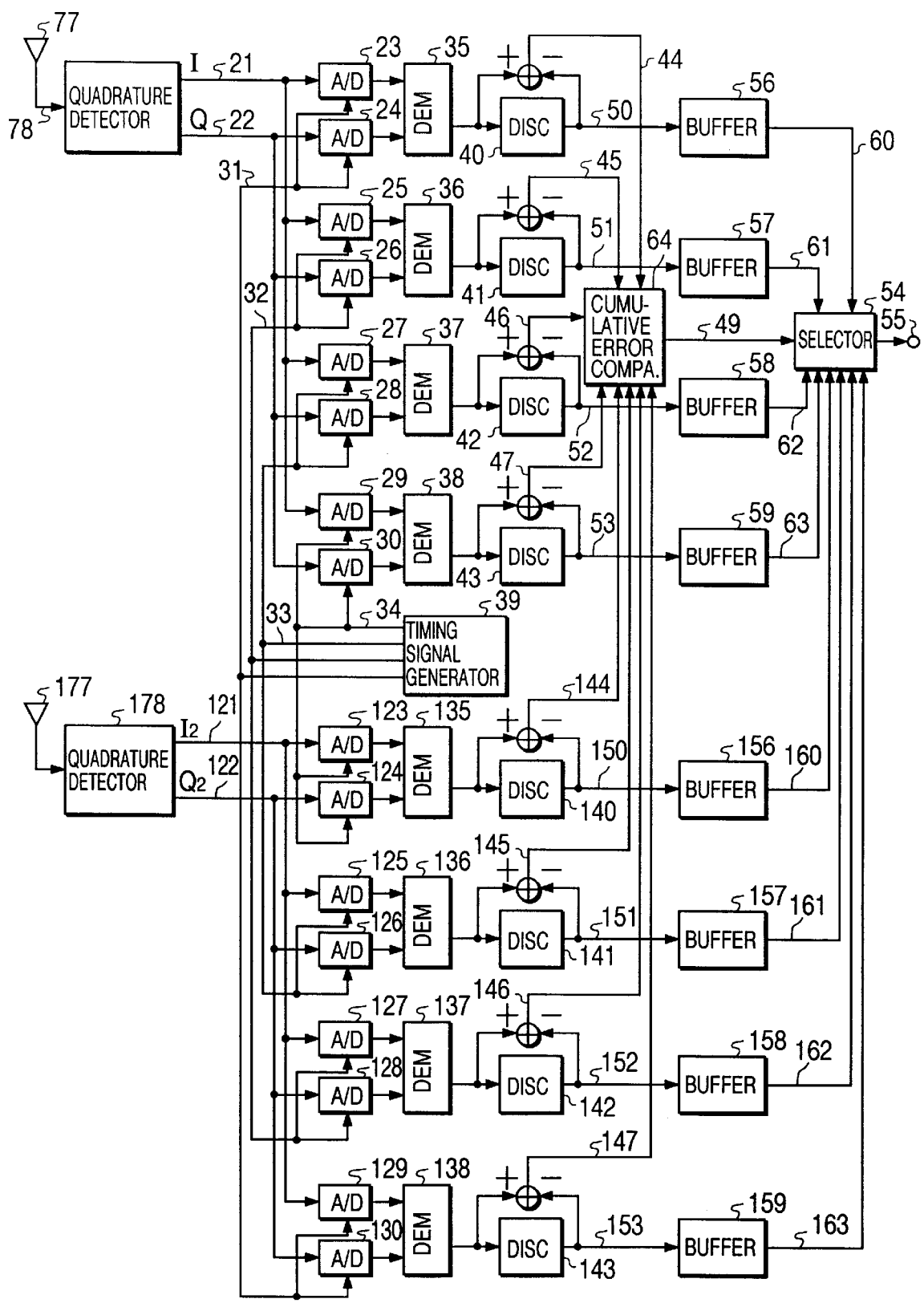
FIG. 9 is a block diagram which shows a circuit structure of a data receiving apparatus according to the ninth embodiment of the invention that has two diversity branches, each including the same arrangement as that of the third embodiment.

FIG. 9 shows a data receiving apparatus according to the ninth embodiment which includes two diversity branches, each having the same circuit arrangement as that shown in FIG. 3. Specifically, this embodiment is different from the one shown in FIG. 7 in that eight buffer memories 56 to 159 are provided, and the cumulative error comparator 64 is provided instead of the instantaneous error comparator 48. Other arrangements are identical.

The cumulative error comparator 64 accumulates the error signals 144 to 147 over a given number of data sampling cycles, respectively, to determine the smallest one of them and provides the comparison signal 49 indicative thereof to the selector 54. The buffer memories 156 to 159 store therein the logic signals 50 to 153, respectively, for the given number of data sampling cycles until the comparison signal 49 is outputted from the cumulative error comparator 64 and then provide them as demodulated signals 160 to 163 the selector 54. The selector 54 selects one out of the demodulated signals 60 to 163 which has been provided through one of the discriminators 140 to 143 showing the smallest cumulative error and provides it as the decoded data 55 ultimately.

Figure 10:
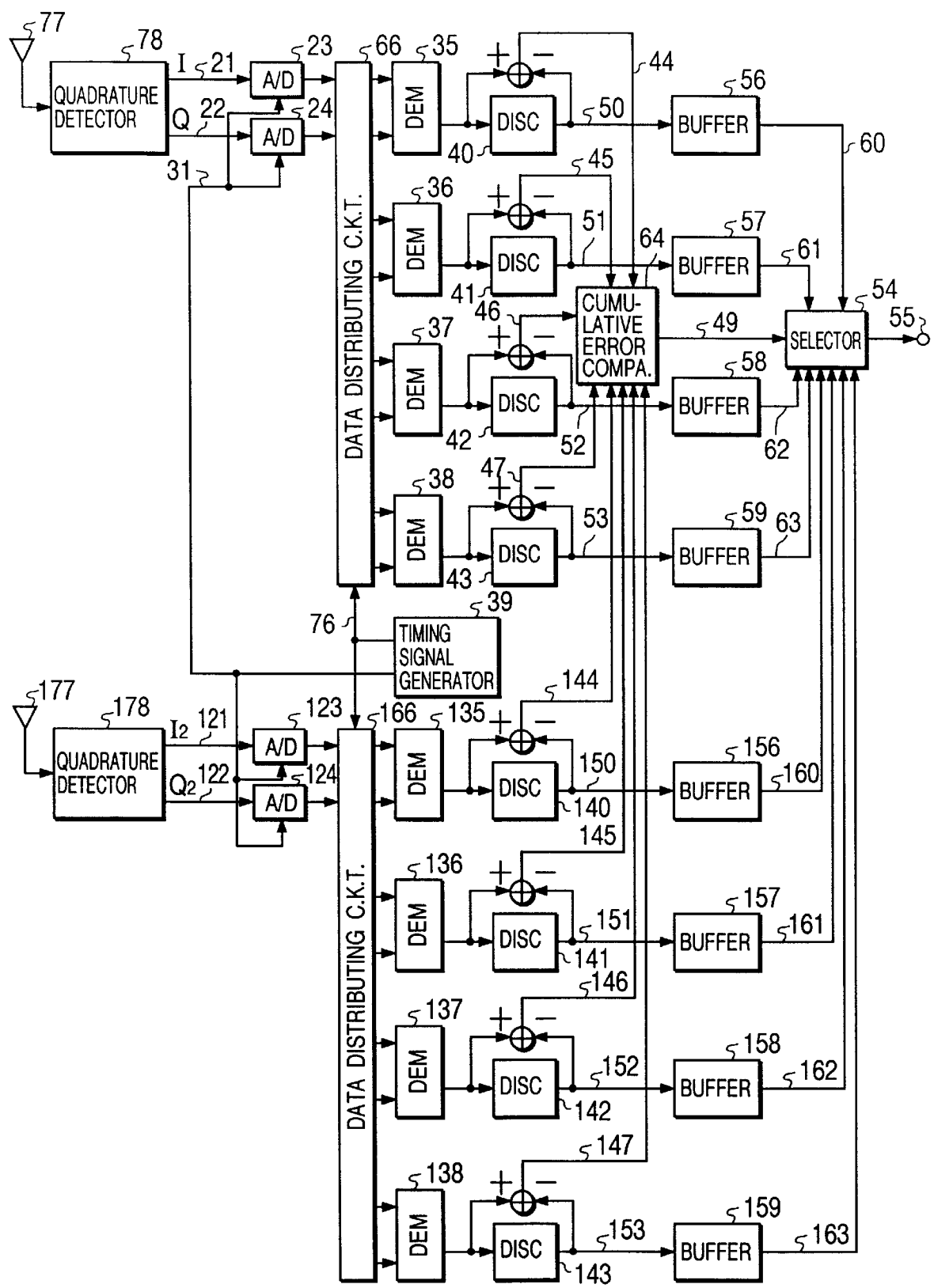
FIG. 10 is a block diagram which shows a circuit structure of a data receiving apparatus according to the tenth embodiment of the invention that has two diversity branches, each including the same arrangement as that of the fourth embodiment.

FIG. 10 shows a data receiving apparatus according to the tenth embodiment which includes two diversity branches, each having the same circuit arrangement as that shown in FIG. 4.

The buffer memories 156 to 159, the cumulative error comparator 64, and the selector 54 are identical with those of the ninth embodiment of FIG. 9, and an operation of each diversity branch is identical with those of the fourth embodiment of FIG. 4. The explanation thereof in detail will be omitted here.

Figure 11:
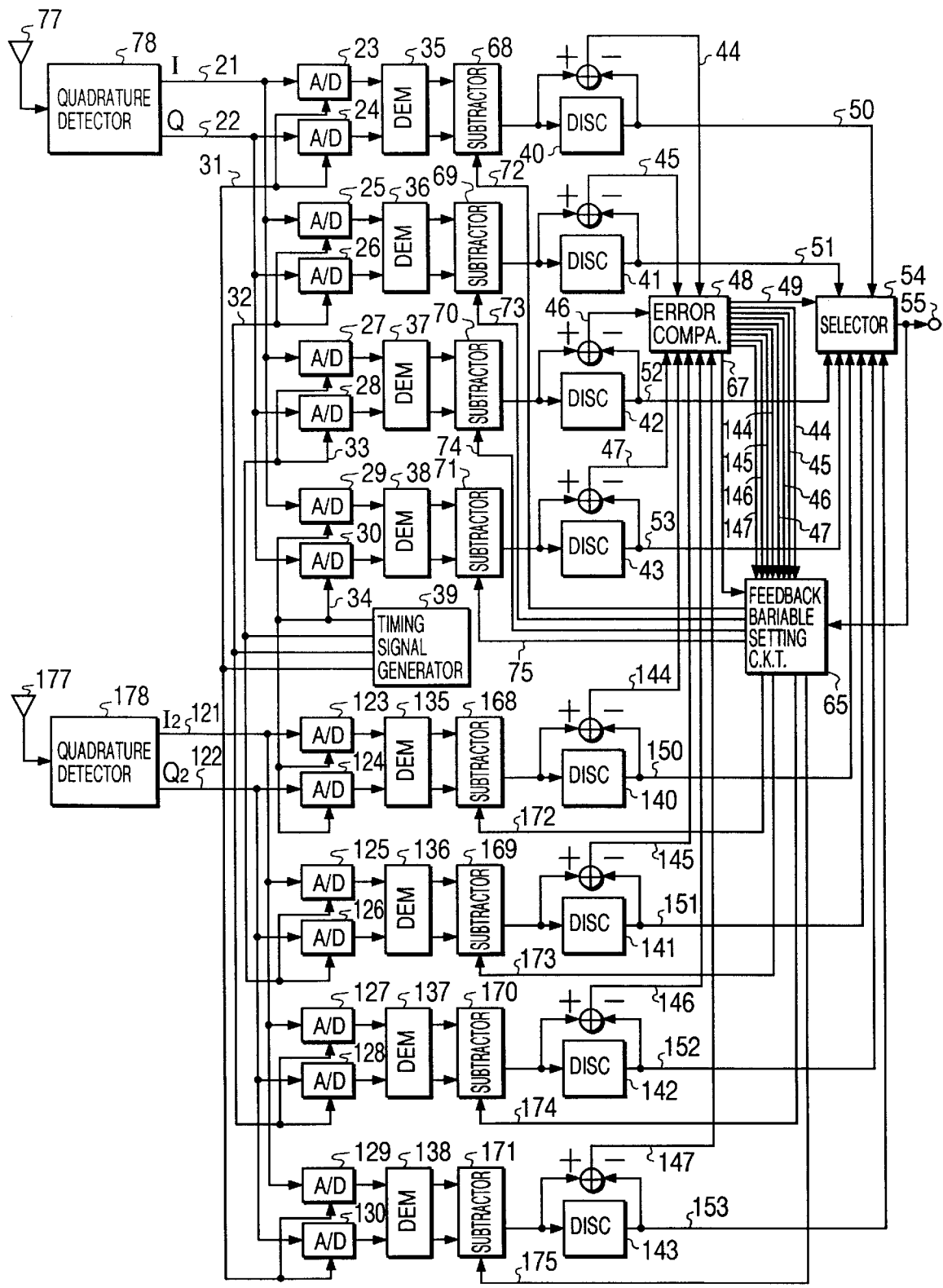
FIG. 11 is a block diagram which shows a circuit structure of a data receiving apparatus according to the eleventh embodiment of the invention that has two diversity branches, each including the same arrangement as that of the fifth embodiment.

FIG. 11 shows a data receiving apparatus according to the eleventh embodiment which includes two diversity branches, each having the same circuit arrangement as that of the fifth embodiment in FIG. 5.

The feedback variable setting circuit 65 estimates residual delayed wave components each existing after demodulation in the demodulators 35 to 138 based on the decoded data 55 selected by the selector 54, the minimum error 67 provided by the instantaneous error comparator 48 (i.e., the smallest of the error signals 144 to 147), and the error signals 44 to 147 using the same adaptive algorithm as that of the fifth embodiment and provides replicas thereof as feedback variables 172 to 175 to the subtractors 68 to 171.

The subtractors 68 to 171 subtract the feedback variables 72 to 175 from outputs from the demodulators 35 to 138 to remove delayed wave components remaining in demodulated signals from the demodulators 35 to 138 and provide delayed wave-removed signals to the discriminators 40 to 143. The discriminators 40 to 143 convert the delayed wave-removed signals into the logic signals 50 to 153 and provide them to the selector 54.

The selector 54 is responsive to the comparison signal 49 to select one of the logic signals 50 to 153 which shows the smallest error and outputs it as decoded data 55. The decoded data 55 is also returned back to the feedback variable setting circuit 65. The feedback variable setting circuit 65 determines the feedback variables 72 to 175 based on the decoded data 55, the minimum error 67, and the error signals 44 to 147, respectively, for subsequent symbol demodulation.

Figure 12:
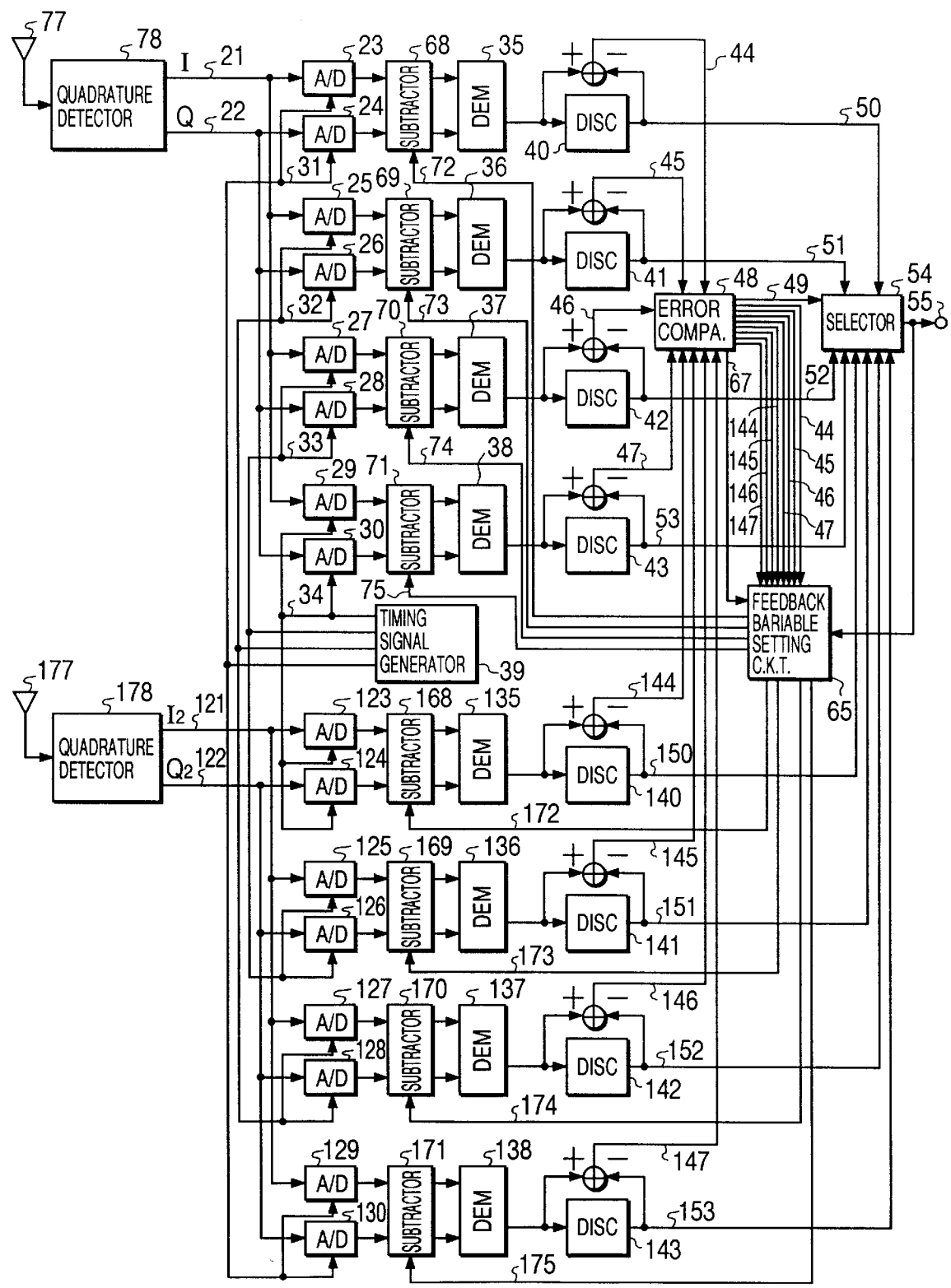
FIG. 12 is a block diagram which shows a circuit structure of a data receiving apparatus according to the twelfth embodiment of the invention that has two diversity branches, each including the same arrangement as that of the sixth embodiment.
Figure 13:
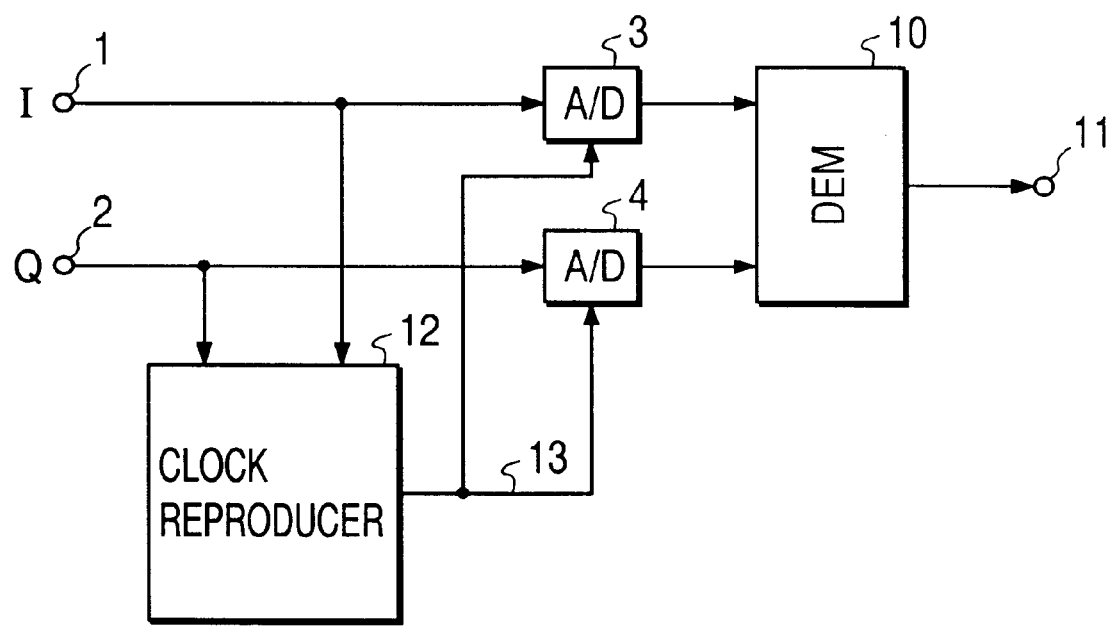
FIG. 13 is a block diagram which shows a circuit structure of a conventional data receiving apparatus.

FIG. 12 shows a data receiving apparatus according to the twelfth embodiment which includes two diversity branches each having the same circuit arrangement as that of the sixth embodiment in FIG. 6. Specifically, this embodiment is different from the eleventh embodiment in FIG. 11 only in that the subtractors 68 to 171 are disposed upstream of the demodulators 35 to 138, respectively. Other arrangements are identical, and explanation thereof in detail will be omitted here.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

For example, the selection of the decoded data in the above embodiments may be made not only based on instantaneous errors or cumulative errors, but also based on comparison of the number of errors in synchronizing signal and/or comparison of variations in envelope.

The first to fifth and seventh to eleventh embodiments may use differential detection circuits as the demodulators 35 to 138, while the sixth and twelfth embodiments may use coherent detection circuits as the demodulators 35 to 138. Usually, the high-speed transmission requires quick signal-processing, therefore, the use of simpler circuit structure is preferred.

What is claimed is:

1. A data receiving apparatus comprising:
    an A/D converting circuit converting an input signal into a sequence of digital signals at a given sampling rate for producing digital signals having different sampling phases;
    demodulators demodulating portions of the digital signals converted with different sampling phases by said A/D converting circuit to produce demodulated signals, respectively;
    discriminators determining logic levels of the demodulated signals provided from said demodulators to produce logic signals, respectively;
    an error comparing circuit comparing each error existing between one of the demodulated signals and a corresponding one of the logic signals to determine the smallest one of the errors; and
    a selecting circuit selecting one of the logic signals showing the smallest error to provide the selected one as decoded data.

2. A data receiving apparatus as set forth in claim 1, further comprising a timing signal generator providing sampling timing signals in sequence to the A/D converters with given phase shifts, and wherein said A/D converting circuit includes a plurality of A/D converters converting the input signal into the digital signals with the difference sampling phases in response to the sampling timing signals.

3. A data receiving apparatus as set forth in claim 1, wherein said A/D converting circuit includes a pair of A/D converters converting first and second input signals into first and second sequences of digital signals at the given sampling rate, respectively, and further comprising a timing signal generator providing distributing timing signals at given intervals and a distributing circuit distributing portions of the first and second sequences of digital signals, in sequence, to said demodulators in response to the distributing timing signals for converting the first and second sequences of digital signals into the demodulated signals.

4. A data receiving apparatus as set forth in claim 1, wherein said error comparing circuit compares said errors to determine the smallest error every decoding of symbols carried by the input signal.

5. A data receiving apparatus as set forth in claim 1, further comprising buffer memories each of which stores a sequence of the logic signals outputted from one of said discriminators over a given number of sampling cycles, and wherein said error comparing circuit determines cumulative errors each including said errors provided by said discriminators over the given number of sampling cycles, respectively, to select the smallest one of the cumulative errors, said selecting circuit providing as the decoded data the logical signals outputted from one of the discriminators showing the smallest cumulative error, stored in one of said buffer memories.

6. A data receiving apparatus as set forth in claim 1, further comprising a feedback variable setting circuit estimating delayed wave components included in the demodulated signals and subtracting circuits subtracting the delayed wave components from the demodulated signals to provide delayed wave-removed demodulated signals, respectively, and wherein said discriminators identify logic levels of the delayed wave-removed demodulated signals to produce the logic signals.

7. A data receiving apparatus as set forth in claim 1, further comprising a feedback variable setting circuit estimating delayed wave components included in the demodulated signals and subtracting circuits subtracting the delayed wave components from the digital signals provided by said A/D converting circuit to provide delayed wave-removed digital signals to the demodulators, respectively, and wherein said discriminators identify logic levels of the demodulated signals from which the delayed-wave components are removed to produce the logic signals.

8. A data receiving apparatus comprising:
    a first data decoding circuit including (a) a first A/D converting circuit converting a first input signal received by a first antenna into a sequence of digital signals at a given sampling rate, (b) first demodulators demodulating portions of the digital signals converted with difference sampling phases by said first A/D converting circuit to produce demodulated signals, respectively, and (c) first discriminators identifying logic levels of the demodulated signals provided from said first demodulators to produce logic signals, respectively;

a second data decoding circuit including (a) a second A/D converting circuit converting a second input signal received by a second antenna into a sequence of digital signals at a given sampling rate, (b) second demodulators demodulating portions of the digital signals converted with difference sampling phases by said second A/D converting circuit to produce second demodulated signals, respectively, and (c) second discriminators identifying logic levels of the demodulated signals provided from said second demodulators to produce logic signals, respectively;

an error comparing circuit comparing errors each existing between one of the demodulated signals and corresponding one of the logic signals to determine the smallest one of the errors; and a selecting circuit selecting one out of the logic signals showing the smallest error to provide the selected one as decoded data.

9. A data receiving apparatus as set forth in claim 8, further comprising buffer memories each of which stores a sequence of the logic signals outputted from one of said first and second discriminators over a given number of sampling cycles, and wherein said error comparing circuit determines cumulative errors each including said errors provided by said first and second discriminators over the given number of sampling cycles, respectively, to select the smallest one of the cumulative errors, said selecting circuit providing as the decoded data the logical signals outputted from one of the first and second discriminators showing the smallest cumulative error, stored in one of said buffer memories.

10. A data receiving apparatus as set forth in claim 8, further comprising a feedback variable setting circuit estimating delayed wave components included in the first and second demodulated signals and subtracting circuits subtracting the delayed wave components from the demodulated signals to provide delayed wave-removed demodulated signals, respectively, and wherein said first and second discriminators identify logic levels of the delayed wave-removed demodulated signals to produce the logic signals, respectively.

11. A data receiving apparatus as set forth in claim 8, further comprising a feedback variable setting circuit estimating delayed wave components included in the first and second demodulated signals and subtracting circuits subtracting the delayed wave components from the digital signals provided by said first and second A/D converting circuit to provide delayed wave-removed digital signals to the first and second demodulators, respectively, and wherein said first and second discriminators identify logic levels of the first and second demodulated signals from which the delayed wave components are removed to produce the logic signals.

12. A data receiving apparatus comprising:

a timing signal generator providing distributing timing signals at given intervals;

a first data decoding circuit including, (a) a first pair of A/D converters converting first and second input signals provided through a first antenna into first and second sequences of digital signals at a given sampling rate, respectively, (b) first demodulators, (c) a first distributing circuit distributing portions of the first and second sequences of digital signals, in sequence, to the first demodulators in response to the distributing timing signals for converting the first and second sequences of digital signals into demodulated signals, respectively, and (d) first discriminators identifying logic levels of the demodulated signals provided from said first demodulators to produce logic signals, respectively;

a second data decoding circuit including (a) a second pair of A/D converters converting third and fourth input signals provided through a second antenna into third and fourth sequences of digital signals at a given sampling rate, respectively, (b) second demodulators, (c) a second distributing circuit distributing portions of the third and fourth sequences of digital signals, in sequence, to the second demodulators in response to the distributing timing signals for converting the third and fourth sequences of digital signals into demodulated signals, respectively, and (d) second discriminators identifying logic levels of the demodulated signals provided from said second demodulators to produce logic signals, respectively;

an error comparing circuit comparing errors each existing between one of the demodulated signals and corresponding one of the logic signals to determine the smallest one of the errors; and a selecting circuit selecting one out of the logic signals showing the smallest error to provide the selected one as decoded data.

13. A data receiving apparatus as set forth in claim 12, further comprising buffer memories each of which stores a sequence of the logic signals outputted from one of said first and second discriminators over a given number of sampling cycles, and wherein said error comparing circuit determines cumulative errors each including said errors provided by said first and second discriminators over the given number of sampling cycles, respectively, to select the smallest one of the cumulative errors, said selecting circuit providing as the decoded data the logical signals outputted from one of the first and second discriminators showing the smallest cumulative error, stored in one of said buffer memories.

* * * * *